(12) United States Patent
Garbacea et al.

(10) Patent No.: US 8,126,283 B1
(45) Date of Patent: Feb. 28, 2012

(54) VIDEO ENCODING STATISTICS EXTRACTION USING NON-EXCLUSIVE CONTENT CATEGORIES

(75) Inventors: Ilie Garbacea, Santa Clara, CA (US); Lulin Chen, Cupertino, CA (US); Jose R. Alvarez, Sunnyvale, CA (US)

(73) Assignee: Maxim Integrated Products, Inc., Sunnyvale, CA (US)

( * ) Notice: Subject to any disclaimer, the term of this patent is extended or adjusted under 35 U.S.C. 154(b) by 1558 days.

(21) Appl. No.: 11/250,102

(22) Filed: Oct. 13, 2005

(51) Int. Cl.
*G06K 9/46* (2006.01)

(52) U.S. Cl. ........ 382/243; 382/232; 382/239; 375/240; 375/240.02; 375/240.08; 375/240.24

(58) Field of Classification Search .................. None
See application file for complete search history.

(56) References Cited

U.S. PATENT DOCUMENTS

| | | | |
|---|---|---|---|
| 5,038,390 A * | 8/1991 | Ravi Chandran | ............. 382/248 |
| 5,079,631 A | 1/1992 | Lhuillier et al. | |
| 5,214,507 A | 5/1993 | Aravind et al. | |
| 5,323,187 A | 6/1994 | Park | |
| 5,351,083 A | 9/1994 | Tsukagoshi | |
| 5,440,346 A | 8/1995 | Jain et al. | |
| 5,459,518 A | 10/1995 | Wickstrom et al. | |
| 5,583,573 A | 12/1996 | Asamura et al. | |
| 5,729,294 A | 3/1998 | Linzer et al. | |
| 5,742,351 A | 4/1998 | Guede | |
| 5,915,250 A | 6/1999 | Jain et al. | |
| 6,118,903 A | 9/2000 | Liu | |
| 6,212,232 B1 | 4/2001 | Reed et al. | |
| 6,285,793 B1 | 9/2001 | Hua | |
| 6,323,914 B1 | 11/2001 | Linzer | |
| 6,389,073 B1 | 5/2002 | Kurobe et al. | |
| 6,490,320 B1 | 12/2002 | Vetro et al. | |
| 6,639,942 B1 | 10/2003 | Bayazit | |
| 6,917,703 B1 * | 7/2005 | Steffens et al. | ............... 382/156 |
| 7,203,381 B2 | 4/2007 | Motomura et al. | |
| 7,266,148 B2 * | 9/2007 | Kim | ......................... 375/240.03 |
| 7,506,024 B2 | 3/2009 | Benitez et al. | |
| 7,715,475 B1 | 5/2010 | Puri et al. | |

(Continued)

OTHER PUBLICATIONS

Aramvith et al. Joint Source-Channel Coding using Simplified Block-Based Segmentation and Content-based Rate-Control for Wireless Video Transport, Proceedings of the International Conference on Information Technology: Coding and Computing (ITCC.02), 2002.*

(Continued)

*Primary Examiner* — Sath V Perungavoor
*Assistant Examiner* — Jason Heidemann
(74) *Attorney, Agent, or Firm* — North Weber & Baugh LLP (57) ABSTRACT

In some embodiments, content-category-level encoding statistical indicators (statistics) are assigned to weighted linear combinations of corresponding macroblock-level statistics. Content categories may identify potentially overlapping content types such as sky, water, grass, skin, and red content. The combination weights may be similarity measures describing macroblock similarities to content categories. A given macroblock may be associated with multiple content categories, with different similarity levels for different content categories. A similarity measure for a given macroblock with respect to a content category may be defined as a number (between 0 and 8) of neighboring macroblocks that meet a similarity condition, provided the macroblock meets a qualification condition. The similarity condition may be computationally simpler than the qualification condition. Macroblock-level encoding parameters are generated by combining content-category-level parameters.

5 Claims, 3 Drawing Sheets

U.S. PATENT DOCUMENTS

| | | | |
|---|---|---|---|
| 2003/0050923 A1 | 3/2003 | Chang et al. | |
| 2004/0114816 A1* | 6/2004 | Sugiyama | 382/239 |
| 2005/0152619 A1 | 7/2005 | Motomura et al. | |
| 2005/0175251 A1 | 8/2005 | Taketa et al. | |
| 2005/0201460 A1* | 9/2005 | Kang et al. | 375/240.03 |
| 2005/0286628 A1 | 12/2005 | Drezner | |
| 2005/0286631 A1* | 12/2005 | Wu et al. | 375/240.12 |
| 2006/0015497 A1* | 1/2006 | Keating et al. | 707/6 |
| 2006/0147112 A1 | 7/2006 | Park | |
| 2006/0204113 A1 | 9/2006 | Wang et al. | |
| 2006/0222078 A1* | 10/2006 | Raveendran | 375/240.16 |
| 2007/0071105 A1 | 3/2007 | Tian et al. | |
| 2007/0074251 A1 | 3/2007 | Oguz et al. | |

OTHER PUBLICATIONS

Chen et al. ROI Video Coding Based on H.263+ with Robust Skin-Color Detection Technique IEEE Transactions on Consumer Electronics, vol. 49, No. 3, pp. 724-730, Aug. 2003.*

Chen et al, ROI Video Coding Based on H.263+ with Robust Skin-Color Detection Technique IEEE Transactions on Consumer Electronics, vol. 49, No. 3, Aug. 2003.*

Chi et al. Foreground/Background Bit Allocation for Region-Of-Interest Coding, ISBN 0-7803-6297-7/00/ IEEE, pp. 923-926, 2000, discloses two methods for bit allocation, MBT and JBA for region-of-interest coding.*

Lin et al. Content-Based Rate Control Scheme for Very Low Bit-Rate Video Coding, EEE Transactions on Consumer Electronics, vol. 43, No. 2, May 1997.*

Mai et al. A Novel Rate-Distortion Optimization Based on Structural Similarity in Color Image Encoder International Journal of Information Technology, vol. 11, No. 7, 2005.*

Office Action mailed Mar. 25, 2009 for U.S. Appl. No. 11/250,109, filed Oct. 13, 2005.

U.S. Appl. No. 11/249,213, Garbacea.

U.S. Appl. No. 11/250,109, Garbacea.

He et al., "Optimum Bit Allocation and Accurate Rate Control for Video Coding via rho-Domain Source Modeling," IEEE Transactions of Circuits and Systems for Video Technology, 12(10):840-849, Oct. 2002.

Milani et al., "A Rate Control Algorithm for the H.264 Decoder," Proceedings of the Sixth Baiona Workshop on Signal Processing in Communications, Sep. 2003, available at http://baionaworkshop.org/Proceedings/milani.pdf.

Kevrann et al., "A Markov Random Field-Model Based Approach to Unsupervised Texture Segmentation Using Local and Global Spatial Statistics," IEEE Transactions of Image Processing, vol. 4. No. 6:856-862, Jun. 1995.

Vetro et al., "Joint Shape and Texture Rate Control for MPEG-4 Encoders," Proceedings of the 1998 IEEE International Symposium on Circuits and Systems, ISCAS 1998, Monterey, CA, vol. 5:285-288, May-Jun. 1998.

Vetro et al., "MPEG-4 Rate Control for Multiple Video Objects ," IEEE Transactions on Circuits and Systems for Video Technology, vol. 9 No. 1:186-199, Feb. 1999.

Hung et al., "Experiments on Image Texture Classification for K-Views Classifier, Markov Random Fields and Cooccurrence Problems," Geoscience and Remote Sensing Symposium, IGARSS'04 Proceedings Anchorage, AK, IEEE, vol. 6:3818-3821, Sep. 20-24, 2004.

Huang et al., "A Novel Moving Object Segmentation Algorithm Based on Spatiotemporal Markov random field," Proceedings of the 2005 International Workshop on VLSI Design and Video Technology, Suzhou, China, IEEE, p. 320-323, May 28-30, 2005.

Office action for related pending U.S. Appl. No. 11/250,109, dated Sep. 29, 2010.

Armvith et al. Joint Source-Channel Coding using Simplified Blocked-Based Segmentation and Content-Based Rate-Control for Wireless Video Transport, Proceedings of the International Conference on Information Technology: Coding and Computing (ITCC.02), 2002.

Chen et al, ROL Video Coding Based on H.263+ with Robust Skin-Color Detection Technique IEEE Transaction son Consumer Electronics, vol. 94, No. 3, pp. 724-730, Aug. 2003.

Chi et al. Foreground/Background Bit Allocation for Region-Of-Interest Coding, ISBN 0-7803-62977/00/ IEEE, pp. 923-926, 2000 discloses two methods for bit allocation, MBT and JBA for region-of interest coding.

Office Action mailed Jan. 28, 2010 for U.S. Appl. No. 11/250,109.

* cited by examiner

VIDEO ENCODING STATISTICS EXTRACTION USING NON-EXCLUSIVE CONTENT CATEGORIES

RELATED APPLICATION DATA

This application is related to the co-filed U.S. Patent Applications entitled "Video Encoding Control using Non-Exclusive Content Categories" and "Video Encoding Mode Decisions According to Content Categories," which are being filed on the same date as the present application and are herein incorporated by reference.

BACKGROUND

The invention relates to data processing systems and methods, and in particular to video encoding systems and methods.

Commonly-used video encoding methods are based on MPEG (Moving Pictures Experts Group) standards such as MPEG-2, MPEG-4 (MPEG 4 Part 2) or H.264 (MPEG 4 Part 10). Such encoding methods typically employ three types of frames: I- (intra), P- (predicted), and B- (bidirectional) frames. An I-frame is encoded spatially using data only from that frame (intra-coded). P- and B-frames are encoded using data from the current frame and other frames (inter-coded). Inter-coding involves encoding differences between frames, rather than the full data of each frame, in order to take advantage of the similarity of neighboring frames in typical video sequences. A P-frame employs data from one other frame, often a preceding frame in display order. A B-frame employs data from two other frames, which may be preceding and/or subsequent frames. Frames used as a reference in encoding other frames are commonly termed anchor frames. In methods using the MPEG-2 standard, I- and P-frames can serve as anchor frames. In methods using the H.264 standard, I-, P-, and B-frames can serve as anchor frames. In methods using the H.264 standard, each macroblock in a frame may be predicted from a corresponding macroblock in any one of a number (e.g. 16) of anchor frames, and/or from another macroblock in the same frame. Different macroblocks in a frame may be encoded with reference to macroblocks in different anchor frames.

Inter-coded (P- and B-) frames may include both intra-coded and inter-coded blocks. For any given inter-frame block, the encoder may calculate the bit cost of encoding the block as an intra-coded block or as an inter-coded block. In some instances, for example in parts of fast-changing video sequences, inter-encoding may not provide encoding cost savings for some blocks, and such blocks can be intra-encoded. If inter-encoding provides desired encoding cost savings for a block, the block is inter-encoded.

Each frame is typically divided into multiple non-overlapping rectangular blocks. Blocks of 16×16 pixels are commonly termed macroblocks. Other block sizes used in encoders using the H.264 standard include 16×8, 8×16, 8×8, 8×4, 4×8, and 4×4 pixels. For each block in a frame, an encoder may search for a corresponding, similar block in that frame's anchor frames or in the frame itself. If a sufficiently similar block is not found, the current block is intra-coded. If a similar block is found, the MPEG encoder stores residual data representing differences between the current block and the similar block, as well as motion vectors identifying the difference in position between the blocks. The difference data is converted to the frequency domain using a transform such as a discrete cosine transform (DCT). The resulting frequency-domain data is quantized and variable-length (entropy) coded before storage/transmission.

Quantizing the data involves reducing the precision used to represent various frequency coefficients, usually through division and rounding operations. Quantization can be used to exploit the human visual system's different sensitivities to different frequencies by representing coefficients for different frequencies with different precisions. Quantization is generally lossy and irreversible. A quantization scale factor or quantization parameter QP can be used to control system bitrates as the visual complexity of the encoded images varies. Such bitrate control can be used to maintain buffer fullness within desired limits, for example. The quantization parameter is used to scale a quantization table, and thus the quantization precision. Higher quantization precisions lead to locally increased bitrates, and lower quantization precisions lead to decreased bitrates.

Determining a quantization parameter for each block to be encoded can be a computationally-intensive process. The choice of quantization parameters affects both system bitrates and distortion, and optimizing quantization parameter choices to achieve simultaneously desired bitrates and distortion characteristics may require computationally-complex steps. Such computational complexity may be of particular concern in systems subject to power limitations, such as mobile video devices.

SUMMARY

According to one aspect, a video encoding method comprises determining a plurality of weights for a video image block, each weight being an indicator of a similarity of the video image block to a content category; setting a quantization precision indicator for the video image block to a linear combination of corresponding content-category-level quantization precision indicators weighted according to the plurality of weights; and encoding the video image block using the quantization precision indicator for the video image block.

According to another aspect, a video encoding method comprises setting a value of a block-level encoding parameter for a block in a video frame to a combination of a plurality of content-category-level extensions of the block-level encoding parameter; and encoding the block according to the value of the block-level encoding parameter.

According to another aspect, a video encoding method comprises determining a plurality of encoding parameters for a corresponding plurality of content categories; setting an encoding parameter for a block in a video frame to a combination of a plurality of encoding parameters defined for a corresponding plurality of content category; and encoding the block according to the encoding parameter for the block.

According to another aspect, a video encoding method comprises performing a weighted linear transformation between a set of block-level encoding parameters and a set of corresponding content-category level extensions of the encoding parameters, and encoding video data using the block-level encoding parameters.

According to another aspect, a video data encoding method comprises assigning a content category target rate for each of a plurality of content categories for a video frame; assigning a content category rate slope $\theta_r$ for said each of the plurality of content categories; determining a fraction of frequency-domain transform zero coefficients for said each of the plurality of content categories from the rate slope $\theta_r$ and the content category target rate; assigning a quantization parameter for said each of the plurality of content categories by interpolating between known correspondences between quantization parameter and fraction of frequency-domain zero coefficient vales; and assigning a quantization parameter for a video data block in the video frame by linearly combining quantization parameters assigned for at least a subset of the plurality of content categories with corresponding weights characterizing a similarity of the video data block to the subset of the plurality of content categories.

According to another aspect, a video data encoder comprises a content category processing unit setting a value of a block-level encoding parameter for a block in a video frame to a combination of a plurality of content-category-level extensions of the block-level encoding parameter; and encoding logic connected to the content category processing unit, the encoding logic encoding the block according to the value of the block-level encoding parameter.

BRIEF DESCRIPTION OF THE DRAWINGS

The foregoing aspects and advantages of the present invention will become better understood upon reading the following detailed description and upon reference to the drawings where.

DETAILED DESCRIPTION OF PREFERRED EMBODIMENTS

In the following description, it is understood that all recited connections between structures can be direct operative connections or indirect operative connections through intermediary structures. A set of elements includes one or more elements. Any recitation of an element is understood to refer to at least one element. The term "logic" refers to special-purpose hardware. Unless otherwise required, any described method steps need not be necessarily performed in a particular illustrated order. A first element (e.g. data) derived from a second element encompasses a first element equal to the second element, as well as a first element generated by processing the second element and optionally other data. The term "quantization precision indicator" may include a quantization step (QStep), a quantization parameter (QP), a percentage of zeros among the quantized transform coefficients ($\rho$), as well as indicators which can be used to derive a quantization step QStep, quantization parameter QP or zero-coefficient fraction $\rho$. For example, such an indicator may include a modulation of QP relative to a slice baseline. A combination of elements is a function of the elements having a value achieved by combining the elements by arithmetic and/or algebraic operations, and not merely by selecting one from among many elements. Unless otherwise specified, a combination may be a linear or a non-linear combination. An encoding statistical indicator for a block is a statistical indicator characterizing at least some encoding process steps or a result of performing at least some encoding process steps on the content of the block. Unless otherwise specified, any recited encoder or decoder encompasses special-purpose encoding/decoding logic, as well as software code running on a programmable (e.g. general-purpose) processor. While the following discussion will focus on an exemplary macroblock (a 16×16 block), other block sizes such as various macroblock partition sizes (8×8, 4×8, 8×4, 4×4 blocks) may be used without limitation in some embodiments of the present invention. Computer readable media encompass storage media such as magnetic, optic, and semiconductor media (e.g. hard drives, optical disks, flash memory, DRAM), as well as communications links such as conductive cables and fiber optic links.

The following description illustrates embodiments of the invention by way of example and not necessarily by way of limitation.

Figure 1:
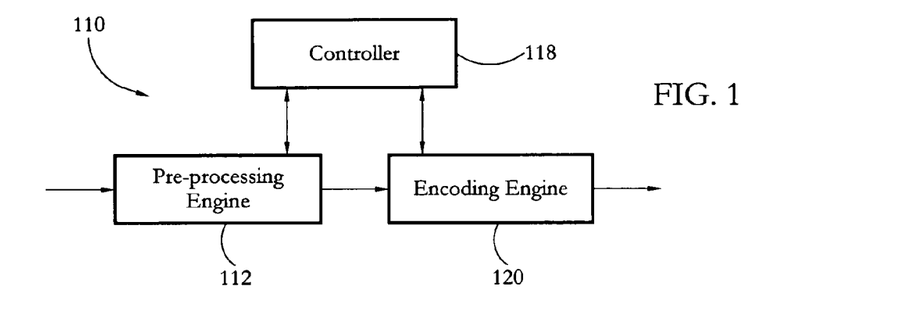
FIG. 1 is a schematic diagram of an exemplary MPEG encoder comprising a pre-processing engine and an encoding engine, according to some embodiments of the present invention.

FIG. 1 is a schematic diagram of the structure of an exemplary MPEG encoder 110 according to some embodiments of the present invention. Encoder 110 generates a standard-compliant output bitstream, which is transmitted to a storage device or communications link for subsequent decoding by a video decoder. Encoder 110 can be implemented using special-purpose hardware, and/or software running on a programmable processor. In some embodiments, encoder 110 can be provided as part of a special-purpose integrated circuit controlling an operation of a device such as a digital video recorder. In some embodiments, encoder 110 can be implemented using software running on a general-purpose computer. In some embodiments, encoder 110 includes special-purpose hardware pre-processing and encoding engines 112, 120, and a software-programmable controller 118 controlling the operation of engines 112, 120. Controller 118 may include a general-purpose central processing unit (CPU), or a microcontroller such as a digital signal processor (DSP). Pre-processing and encoding engines 112, 120 may be implemented using special-purpose hardware blocks (logic). In some embodiments, at least parts of engines 112, 120 can be implemented using software running on a programmable processor.

Controller 118 executes software instructions that control the operation of encoder 110, and in particular instructions that determine macroblock quantization parameters and other encoding parameters as described below. Pre-processing engine 112 receives input data to be encoded, and generates a set of pre-processing statistics characterizing the input data content. In some embodiments, computed statistics include a set of parameters for each macroblock in a frame, such as parameters characterizing the low frequency content, high-frequency content, motion, and color of each macroblock. Encoding engine 120 receives the input data, and generates an encoded standard-compliant output bitstream as described below.

Figure 2:
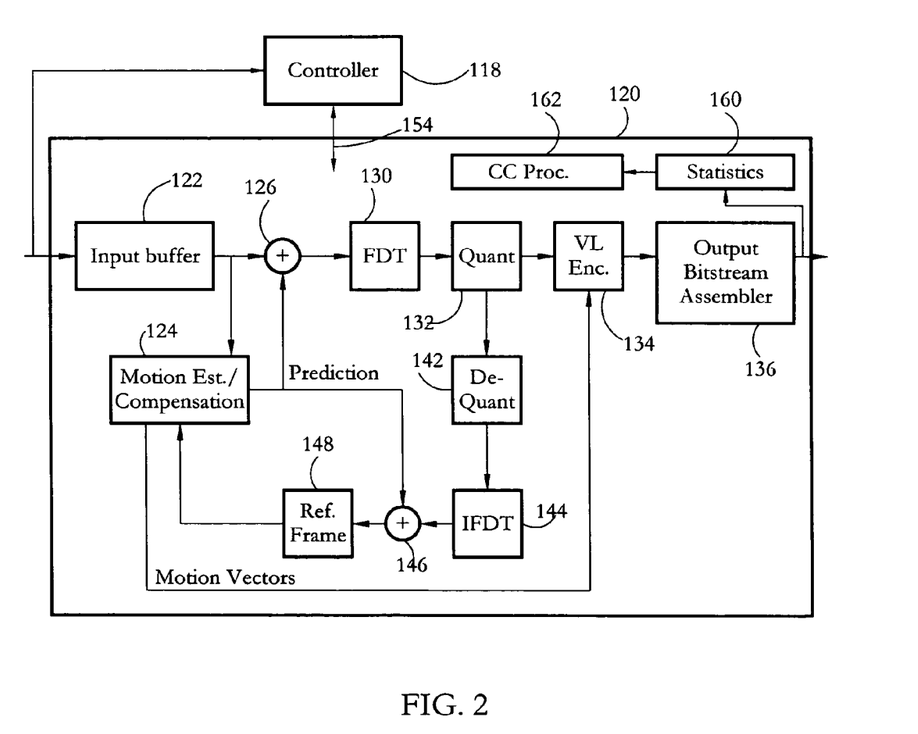
FIG. 2 is a schematic diagram of an exemplary encoding engine according to some embodiments of the present invention.

FIG. 2 shows a schematic diagram of encoding engine 120. Controller 118 is connected to various functional blocks of encoding engine 120, as illustrated by the connection arrow 154 in FIG. 2. The various connections between the functional blocks shown in FIG. 2 may be implemented directly, or through one or more intermediary structures such as a data switch operating under the control of controller 118.

Encoding engine 120 includes an input buffer 122, which receives an input bit sequence, and an output bitstream assembler 136, which outputs a standard-compliant output bitstream. In some embodiments, input buffer 122 may be provided as part of pre-processing engine 112 (FIG. 1). A number of functional blocks are connected in series between input buffer 122 and output bitstream assembler 136: a differential processing unit 126, a frequency-domain transform (FDT) unit 130, a quantization unit 132, and a variable length (entropy) encoder unit 134. A predictive part of the encoder includes a plurality of functional blocks connected between quantization unit 132 and input buffer 122: a de-quantization (inverse quantization) unit 142, an inverse frequency-domain transform (IFDT) unit 144, a differential processing unit 146, a reference frame storage unit 148, and a motion estimation/compensation unit 124. A statistics unit 160 is connected to output bitstream assembler 136. A content-category processing unit 162 is connected to statistics unit 160 and, along with other logic units illustrated in FIG. 2, to controller 118. In some embodiments, encoding engine 120 may include functional units other than the units shown in FIG. 2, such as one or more functional units configured to perform intra-frame predictive encoding, and/or a de-blocking filter. An intra-frame prediction unit may be employed to generate intra-frame predictions for differentially encoding data with reference to other macroblocks in the same frame. A de-blocking filter may be connected to the output of differential processing unit 146, to reduce blocking distortions caused by dividing a frame into macroblocks for encoding.

Input buffer 122 receives an input bit sequence and buffers the input frame data for subsequent processing. Buffering is used for example for encoding P-frames or B-frames for which the encoding order may be different from the input/display orders. For inter-encoded data, differential processing unit 126 subtracts compensated coded anchor frame data from corresponding input frame data to generate residuals to be encoded. Intra-coded data is not processed by processing unit 126. FDT unit 130 transforms space-domain data (intra-encoded or residual data) into corresponding frequency-domain data. Quantization unit 132 quantizes the frequency-domain data using stored quantization table data and quantization parameters received from controller 118. Variable-length encoder 134 applies an entropy coding operator to quantized data received from quantization unit 132, and, for inter-coded frames, to motion vector data received from motion compensation unit 124.

Motion estimation/compensation unit 124 receives input uncompressed video data from input buffer 122 and reference frame data from reference frame storage unit 148, and outputs prediction and corresponding motion vector data. De-quantization unit 142 de-quantizes data received from quantization unit 132, and IFDT unit 144 applies an inverse discrete cosine transform operator to the resulting de-quantized data. Processing unit 146 adds prediction data received from motion compensation unit 124 to decoded residuals received from IFDT unit 144 to generate inter-encoded reference frames. Storage unit 148 stores decoded reference frames.

Intra-encoded frame data follow essentially a straight path through encoder 120, from frame switch/reordering unit 122 to bitstream assembler 136. For intra-frames serving as reference (anchor) frames, the intra-encoded data is decoded by de-quantization unit 142 and IFDT unit 144 to generate a reference frame, which is stored in reference frame storage unit 148. For inter-coded frames, inter-coded blocks are encoded differentially, with respect to corresponding intra-coded reference frame blocks stored in reference frame storage unit 148. Intra-coded reference frame (prediction) data is subtracted from current frame data by processing block 126, and the resulting residuals are transformed by FDT unit 130, quantized by quantization unit 132, and encoded by variable-length encoder 134. If the inter-coded frame serves as an anchor frame, a reference frame is constructed by decoding the frame. Processing block 146 adds residual data generated by de-quantization unit 142 and IFDT unit 144 to intra-coded prediction data received from motion compensation unit 124 to generate the reference frame. The reference frame is stored in reference frame storage unit 148, and is used to encode other inter-encoded frames.

Statistics unit 160 extracts a set of frame statistics for a current frame and/or a number of frames preceding the current frame in display order. In some embodiments, the frame statistics include spectral statistics such as indicators of low frequency (e.g. DC) content and high-frequency content in the current frame, quantization precision indicator history data such as $\rho$ history data and quantization-parameter (QP) history data, and other encoding parameter data such as rate-distortion statistics. In some embodiments, statistics unit 160 generates a set of content-category level statistics by linearly combining a set of macroblock-level statistics as described in detail below.

Content category processing unit 162 receives content-category-level statistics from statistics unit 160. Content category processing unit 162 also receives content-category-level encoding parameters, rate data and other data from controller 118. Content category processing unit 162 generates block-level encoding parameters and encoding-mode decision indicators from content-category level parameters and mode decision indicators, as described in detail below. The block-level encoding parameters and mode-decision indicators are provided to controller 118, for use in controlling the operation of encoder 110. As an illustration, content category processing unit 162 generates block-level quantization parameter modulations used to control the quantization precision used by quantization unit 132. In some embodiments, content category processing unit 162 may include a programmable processor, or may be included as part of encoder controller 118.

Figure 3:
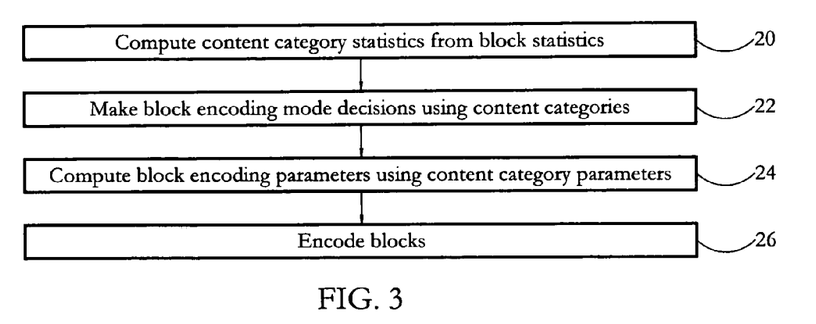
FIG. 3 shows a sequence of steps performed by a video image encoder in encoding video data, according to some embodiments of the present invention.

FIG. 3 shows a sequence of steps performed by a video image encoder according to some embodiments of the present invention. In a step 20, a set of content-category-level statistics are generated by linearly combining a set of block-level statistics. An encoding mode decision for a current block is made according to encoding mode guidelines provided by a set of content categories similar to the current block (step 22). In a step 24, a set of block-level encoding parameters is generated according to a set of content categories similar to the current block. The current block is encoded according to the encoding mode decision and the block-level encoding parameters (step 26).

Figure 4:
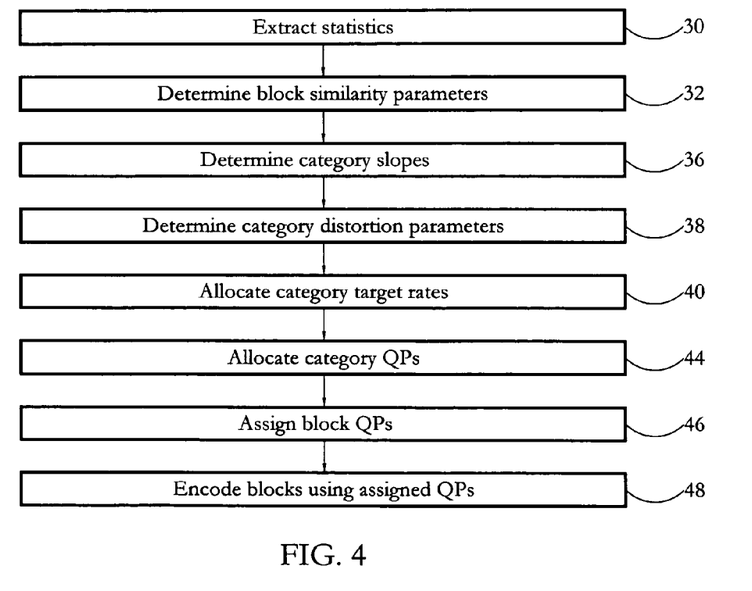
FIG. 4 shows a sequence of steps performed by a video image encoder in encoding a frame using block-level quantization parameters determined according to content-category-level quantization parameters, according to some embodiments of the present invention.

In some embodiments, an encoding parameter of particular interest is a quantization precision indicator such as a quantization parameter (QP), which can be used to control the output bitstream rate. FIG. 4 shows a sequence of steps performed by a video image encoder in encoding a current frame or part of a frame according to some embodiments of the present invention. A result of the sequence of steps of FIG. 4 is a determination of a quantization parameter for each block (e.g. macroblock) in the current frame. In a step 30, the encoder extracts a set of frame statistics for a current frame to be encoded and/or a number of immediately preceding frames. In a step 32, the encoder determines a set of block similarity parameters for each current block, as described in detail below. Each similarity parameter characterizes a similarity of the current block to a content category, for example to a parameter or function associated with that content category. In some embodiments, a similarity parameter for a current macroblock with respect to a given content category is defined to be a number of macroblocks that are immediate neighbors of the current macroblock and meet a similarity condition with respect to the current macroblock, provided that a qualification condition for the current macroblock is met. In some embodiments, the similarity parameter for the current macroblock may not depend on the properties of neighboring macroblocks. The similarity parameters for each block are used in a block-level quantization parameter assignment step (step 46, described below) as weighting factors in a linear combination of content-category-level quantization parameters.

In a step 36, a plurality of content category slopes are determined for a corresponding plurality of content categories. Each content category is assigned a corresponding category slope. A distortion parameter is also determined for each content category (step 38). The determined category slopes and distortion parameters are used, among others, to assign a target rate for each content category (step 40). In a step 44, each content category target rate is used to determine a corresponding content category quantization parameter (QP). The content category QPs are used, in linear combinations, to assign a quantization parameter for each macroblock to be encoded (step 46). The assigned macroblock QPs are used to encode the macroblocks (step 48).

Figure 5:
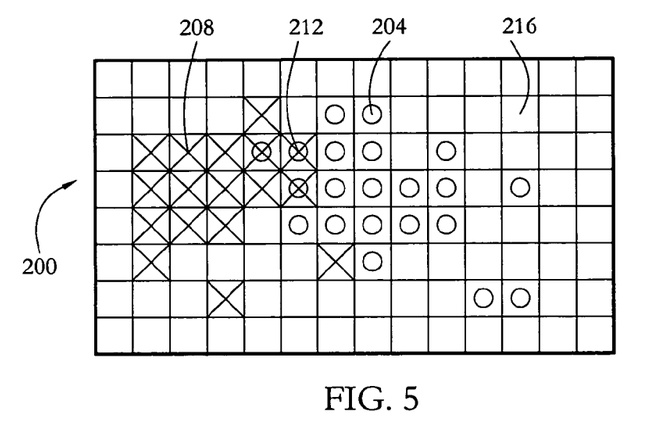
FIG. 5 shows a part of a picture including macroblocks belonging to two non-exclusive content categories according to some embodiments of the present invention.

FIG. 5 schematically illustrates an exemplary relationship between a set of macroblocks and two content categories according to some embodiments of the present invention. In some embodiments, defined content categories may correspond generally to visually-distinguishable content types such as flat surfaces (e.g. sky), regularly textured surfaces (e.g. water, grass), and fast-moving content, among others. FIG. 5 shows a part of a frame including a plurality of macroblocks 200. Macroblocks that meet a content condition defining a first content category are marked by internal circles, as illustrated by an exemplary macroblock 204. Macroblocks that meet a content condition defining a second content category are marked by internal X marks, as illustrated by an exemplary macroblock 208. Some macroblocks, such as an exemplary macroblock 212, may satisfy both the first and second content conditions. The defined content categories may thus overlap. The blank macroblocks shown in FIG. 5 (e.g. an exemplary macroblock 216) may belong to other content categories. As will become apparent from the discussion below, a content category may define a set of properties, rather than strictly a spatial area defined within a frame.

In some embodiments, an encoding parameter (e.g. a quantization parameter QP, among others) for a macroblock m is set to be a linear combination of corresponding content category encoding parameters according to the relation $$p_m = K \sum_{r \in R} W_{m,r} P_r \quad [1a]$$

wherein $p_m$ is an encoding parameter for a macroblock m, $P_r$ is a corresponding encoding parameter defined for a content category (region) r, $W_{m,r}$ is a weight characterizing a similarity of the macroblock m to content category r, K is a normalization constant, and R is the set of content categories r.

In some embodiments, each weight $W_{m,r}$ depends solely on a relationship between a content of macroblock m and a set of characteristics defining the content category r, and not on the properties of other (e.g. neighboring) macroblocks. In some embodiments, each weight $W_{m,r}$ may depend on the content of macroblock m and also on the content of other, e.g. neighboring, macroblocks within the same frame or within other frames. Making content category weight determinations based on the properties of external content may allow limiting intra-frame (spatial) and inter-frame (temporal) fluctuations in quantization parameter weights.

In some embodiments, a content category-level encoding parameter (e.g. a slope θ, among others) for a content category r is set to a linear combination of corresponding macroblock parameters according to the relation $$P_r = k \sum_{m \in M} w_{m,r} p_m \quad [1b]$$

wherein $p_m$ is a block-level parameter for a macroblock m, $P_r$ is a corresponding parameter defined for a content category r, $w_{m,r}$ is a weight characterizing a similarity of the macroblock m to content category r, k is a normalization constant, and M is the set of macroblocks m. In preferred embodiments, the weights $w_{m,r}$ of eq. [1b] are identical to the corresponding weights $W_{m,r}$ of eq. [1a]. Eq. [1b] is particularly useful for generating content-category level statistics from block-level statistics.

Exemplary Content Category Definitions

In some embodiments, each weight $W_{m,r}$ for a macroblock m is proportional to a number of neighboring macroblocks that meet a similarity condition with respect to a given content category. Consider a set M of macroblocks m, and let $V_m$ be the set 8 neighboring macroblocks, i.e. macroblocks located above, left, right, below, above left, above right, below left and below right with respect to a macroblock m. A similarity measure $s_m$ for each macroblock m may be defined as an integer number, on a scale of 0 to 8, of neighboring macroblocks that meet a similarity condition with respect to a macroblock parameter $p_m$ provided that a qualification condition $q_m$ for the macroblock m is satisfied.

Formally, a preliminary similarity parameter s: M→ {0, . . . , 8} may be defined as $$s_m = |\{x \in V_m | -T < p_m - p_x < T \text{ and } q_m \text{ is true}\}| \quad [2]$$

wherein T is a threshold. The notation s: M→{0, . . . , 8} indicates that the similarity function s takes as an argument a macroblock m from the macroblock set M, and yields an integer value between 0 and 8. That integer value is the number of neighboring macroblocks (in eq. [2], macroblocks x belonging to the set $V_m$) for which the absolute value of the difference between $p_m$ and $p_x$ is less than the threshold T, with an overriding rule that the integer value is zero if the qualification condition $q_m$ is not met for the current macroblock m. Neighbor similarity conditions other than the threshold condition shown in eq. [2] may be used in some embodiments. In eq. [2], $p_m$ is the value of the parameter p for the current macroblock m, and $p_x$ denotes the values of the parameter p for the neighboring macroblocks x.

The macroblock parameters $p_m$, the qualification condition $q_m$, and the threshold T (or in general, a similarity condition) may be chosen to identify meaningful areas or objects in a picture, such as water or sky. For example, to identify sky areas, the macroblock parameter $p_m$ may be an average luminance and the qualification condition $q_m$ may call for the average color to be a shade of blue. Sky may be further identified by an overrepresentation of low-frequency content relative to high-frequency content. In some embodiments, the macroblock parameter $p_m$ is a low-frequency content indicator indicating an average low-frequency content for the block, while the qualification condition $q_m$ is a function of one or more parameters such as luminance low/high frequency content, motion, edges, and chrominance (color detection). Consequently, the similarity function $s_m$ may depend on such multiple variables characterizing texture, motion, edge, and color content.

In some embodiments, the macroblock parameter $p_m$ is compared over the neighboring macroblocks while the qualification condition $q_m$ is tested only for the current macroblock itself. In some embodiments, the macroblock parameter $p_m$ and the qualification condition $q_m$ are chosen such that the computational complexity of calculating each of the set of eight values $p_m$ is substantially less than the complexity of calculating a value of $q_m$ for a given macroblock. In such embodiments, a relatively complex qualification condition may be used as a threshold determination, and a computationally-simple test may be used to compare the current macroblock m to its neighbors.

In some embodiments, a similarity measure that takes into account neighboring macroblock content (e.g. a similarity measure such as the one defined by eq. [2]) is used for some content categories, while other content categories may employ similarity measures that take into account only the content of the current macroblock, and not the content of external (e.g. neighboring) macroblocks.

In some embodiments, the similarity measures $s_m$ are spatially and temporally smoothed out after an initial computation according to eq. [2]. Spatial smoothing is performed within the current frame, while temporal smoothing is performed across successive frames. Spatial and temporal smoothing improve the spatial (within a picture) and temporal (across pictures) stability of the assignment of content category similarity measures to given macroblocks. Spatial smoothing decreases the chance of spurious, isolated similarity assignments within a frame. Temporal smoothing decreases the chance of large similarity assignment variations across frames for content areas that stay visually relatively unchanged across frames. In some embodiments, spatial filtering is performed by applying horizontal and vertical median filters to the similarity measure data generated using eq. [2]. A median filter assigns a function value for a given macroblock to be equal to the median of the function values for neighboring macroblocks. For example, a 3×3 median filter assigns the value at the center of a 3×3 square to be the median of the eight values adjacent to the center; the median may be taken to be the average of the two middle values in the distribution. In some embodiments, temporal domain (across pictures) filtering is performed by applying a low-pass recursive filter.

After spatial and temporal filtering of similarity values determined according to eq. [2], the set of final, filtered similarity measures $s_m$ characterizes a corresponding content category r. In some embodiments, a content category r is fully characterized by the following elements: macroblock parameter $p_m$, threshold T, qualification condition $q_m$, spatial vertical and horizontal median filters, and temporal recursive low pass filter. For the same video sequence, multiple macroblock parameters $p_m$ and qualification conditions $q_m$ can be used to define multiple content categories r. In some embodiments, the spatial median and temporal recursive filters do not change from content category to content category.

Generally, a similarity parameter for a current macroblock may be defined with respect to each content category of interest, or formally s: M×R→{0, ..., 8}, where R is the set of all content categories. That is, a value $s_{m,r}$ is defined for each macroblock m and content category r. As above, the similarity coefficient $s_{m,r}$ is proportional to the weight $w_{m,r}$ in eq. [1a]. In the following discussion, the similarity measure $s_{m,r}$ is treated by default as a value specific for each macroblock and content category.

The complete set of similarity measures $s_{m,r}$ classifies all macroblocks with respect to each content category and its complement (exterior): if a macroblock has a similarity measure of s, then 8−s is a dissimilarity measure, or the similarity of the content category's complement.

For each content category r, the complement (exterior) $\bar{r}$ with respect to M may be defined as $$\bar{r} = \{m \in M | m \notin r\} \quad [3]$$

The similarity measure s: M×R→{0, ..., 8} may be defined to satisfy the relationship $$s_{m,r} + s_{m,\bar{r}} = 8 \, \forall r \in R, m \in M \quad [4]$$

The complement content category $\bar{r}$ may be used for the convenience of handling each content category independently of other content categories.

In some embodiments, a set of eight content categories is defined as shown below in Table 1:

TABLE 1

| Content Category | Texture | Motion | Color |
|---|---|---|---|
| 1 | Low | Low | R/G/B |
| 2 | Low | High | R/G/B |
| 3 | High | Low | R/G/B |
| 4 | High | High | R/G/B |
| 5 | any | any | Red |
| 6 | Low | Low | Green |
| 7 | High | High | Green |
| 8 | High | High | Blue |

The low and high thresholds for texture and motion may be defined as fractions of corresponding frame averages. In some embodiments, a texture high/low threshold is defined at a level between 10% and 50% (e.g. about 25%), of the current frame texture average, while a motion high/low threshold is defined at a level between 5% and 25% (e.g. about 10%) of the current frame motion average. Suitable texture and motion parameters may be defined by applying appropriate filter(s) to video data, as is known in the art. For example, a texture measure may include the results of applying one or more edge detection filters to video data. A motion measure may include a result of identifying differences in intensity and/or color between co-located pixels in the current, previous and subsequent frames.

As Table 1 shows, some macroblocks may belong to more than one content category at the same time. For example, a macroblock belonging to any of the categories 5-8 will also generally belong to one of the categories 1-4. In table 1, category 1 corresponds generally to flat, motionless areas such as sky or other flat surfaces. Category 2 corresponds generally to flat surfaces exhibiting more motion. Category 3 corresponds to textured surfaces with relatively low motion, while category 4 corresponds to textured surfaces with relatively high motion. Category 5 defines red objects. Categories 6 and 7 correspond generally to grass-like areas showing low and high motion, respectively. Category 8 corresponds generally to water.

In some embodiments, the set of defined content categories may include a default or background content category, chosen for any block which does not otherwise belong to another defined content category. In such embodiments, the encoder may check whether a given block belongs to each of a primary subset of content categories. If the encoder does not belong to any primary content category (e.g. the similarity coefficients for all primary content categories are zero), the encoder assigns the block to the default content category, with a maximum similarity coefficient value.

In some embodiments, a content category selected from the categories shown in Table 1 is used in a given frame only if that content category has non-zero similarity measures for a number of macroblocks in a pre-defined range, for example between 10% and 90%, or between 5% and 95%, of the total picture macroblocks. For each content category, the encoder calculates the number or fraction of macroblocks in the frame that have non-zero similarity coefficients with respect to the content category. If the macroblock fraction is within the allowed range (e.g. between 10 and 90%), the content category is used in subsequent calculations as described below. If the macroblock fraction is outside the allowed range (e.g. less than 10% or more than 90%), the content category is deemed not to be meaningful and is not used in subsequent calculations. Not using a content category in subsequent calculations may be achieved by setting the similarity values for that content category to zero for all macroblocks in the frame, or by simply ignoring that content category in subsequent calculations. A content category that covers a small picture area or almost the entire picture may not provide meaningful distinguishing information that would significantly improve encoding allocation decisions. In some embodiments, using a frame-level qualification condition for content categories may reduce the computational cost of using content categories, particularly if larger numbers (e.g. tens, hundreds, or even thousands) or content categories are defined and employed.

Correspondence Between Macroblock and Content Category Parameters

The exemplary content categories discussed above may be thought of as simple modalities of associating specific compression decisions to meaningful areas or objects present in a video sequence. In an encoding system in which encoding parameter (e.g. quantization parameter) decisions are made at the macroblock level, encoding parameters determined at the content category level are translated to the macroblock level. After encoding, as part of a feedback loop, macroblock-level statistics may be extended to the content-category level. For example, a picture bitrate may be seen as the sum of the bitrates of a content category and its complement. Content category statistics are employed to select encoding parameters at the content category level, as described below.

Consider a macroblock level parameter $p_m$ and its corresponding linear content-category-level extension $P_r$. If the macroblock-level parameter and its extension are linearly related, then the extension $P_r$ may be defined such that $$P_r + P_{\bar{r}} = \sum_{m \in M} p_m \forall r \in R, \qquad [5]$$

since each content category and its complement completely cover all macroblocks. If eq. [5] does not hold, then $P_r$ is not properly defined as a linear extension of $p_m$. One way to satisfy eq. [5] is to define $P_r$ as $$P_r = \frac{1}{8} \sum_{m \in M} s_{m,r} p_m \forall r \in R. \qquad [6]$$

The ⅛ normalization constant in eq. [6] originates from the chosen range of values {0 . . . 8} taken on by the similarity parameter $s_{m,r}$. If $p_m$ is the macroblock size measured in macroblocks, i.e. $p_m$ is 1 for any macroblock m, then the content category size $N_r$ in macroblocks is $$N_r = \frac{1}{8} \sum_{m \in M} s_{m,r} \forall r \in R \qquad [7]$$

As in eq. [5], a content category and its complement cover all macroblocks, so $$N_r + N_{\bar{r}} = |M| \forall r \in R \qquad [8]$$

wherein |M| is the total number of macroblocks. Other examples of macroblock parameters $p_m$ may include the macroblock bits, the number of non-zero coefficients, or the sum of (squared) prediction errors.

Conversely, a linearly-defined content category parameter $P_r$ may be converted to a corresponding macroblock level parameter $p_m$. If $p_m$ is to be proportional with the similarity values for all content categories, $p_m$ may be defined as $$p_m = \frac{1}{8} \sum_{r \in R} s_{m,r} P_r \forall m \in M. \qquad [9]$$

At the picture level, i.e. for the whole set M of macroblocks, $$\sum_{m \in M} p_m = \frac{1}{8} \sum_{r \in R} \sum_{m \in M} s_{m,r} P_r = \frac{1}{8} \sum_{r \in R} 8 N_r P_r = \sum_{r \in R} N_r P_r \qquad [10]$$

which means that the content-category parameter $P_r$ contributes to the sum of the macroblock-level parameters proportionally with the content category size.

For example, consider a content-category level parameter $P_r$ defined as a relative QP change (adjustment) suggested on a category-by-category basis. Each macroblock will have its own relative QP change determined according to all content categories. Minimizing the picture-level average QP change (due to rate control constraints, for example) is then equivalent to setting $$\sum_{r \in R} N_r P_r = 0. \qquad [11]$$

Rate-Distortion Analysis

Video bit rate is commonly controlled by the quantization parameter QP. A core problem in rate control is to estimate the rate-quantization and distortion-quantization functions commonly known as the rate-distortion functions. Based on estimated rate-distortion functions, the encoder selects suitable quantization parameters to achieve the target bit rate and/or picture distortion (quality). The target bitrate may be determined by parameters such as target buffer level, frame rate, channel bandwidth, and actual buffer occupancy. The target distortion may be computed as mean-square error or absolute difference between the coded image and the original. Generally, an encoder may attempt to minimize the picture distortion given target rate constraints.

Empirically, a rate-distortion curve may be interpolated between several sampled values. A rate-distortion curve describes the interdependence between the system rate and distortion. A rate-distortion interpolation process may have relatively high computational requirements, and may not yield much insight into the video coding process. A rate-distortion curve may also be derived using analytical estimations, i.e. mathematical models based on the properties of video DCT coefficients. Gaussian and Laplacian distributions are the most popular statistical models used for quantization-parameter-domain (q-domain) rate-distortion analysis. Such q-domain models may employ complex and highly non-linear expressions, and may exhibit control errors and performance degradation specific to each video coding system In some embodiments, rate-distortion analysis may be performed in an alternative domain. One such domain, called the ρ-domain, is based on the percentage of zeros among the quantized DCT coefficients. A ρ-domain model is linear, may be unified for several coding systems (JPEG, MPEG-2, 4, H.263, 264), and is capable of controlling the bit rate relatively accurately and robustly.

In some embodiments, a linear rate-quantization model may be used to estimate the effect of quantization parameter changes on the system rate. Let ρ be the percentage of zeros among the quantized DCT coefficients for a quantization parameter QP. There is a one-to-one mapping between ρ and QP, since ρ monotonically increases with QP. The one-to-one mapping may not have a closed form (linear, polynomial, exponential, logarithmic, etc).

Let rate curves $Q_{nz}(\rho)$ and $Q_z(\rho)$ be the pseudo-coding bit rates for nonzero and zero DCT quantized coefficients. The bit rate for non-zero coefficients is proportional to the average number of non-zero coefficient bits, while the bit rate for zero coefficients is proportional to the average zero-coefficient run length. The rate in the ρ-domain is a linear combination of the characteristic rate curves $Q_{nz}(\rho)$ and $Q_z(\rho)$. Generally, the non-zero coefficient rate $Q_{nz}(\rho)$ is linear and the zero-coefficient rate $Q_z(\rho)$ has a minor contribution, so the total rate may be approximated as a linear function of ρ:

$$R(\rho) = \theta(1-\rho). \quad [12]$$

The parameter θ, called slope, is a constant for a given frame and video system (encoding algorithm). This linear relation has been statistically verified by encoding various sequences multiple times with 16 to 24 different quantization parameters and running linear regressions on the resulting rates with respect to the percentages of zero DCT coefficients. For example, sample tested sequences passed the Fisher null hypothesis test with associated probability of 99.999% and the coefficient of determination $r^2$ (i.e. the proportion of rate variation explained by the linear regression) is more than 95%. From eq. [12], a value of the slope θ may be taken to be:

$$\theta = \frac{1}{1-\rho} R. \quad [13]$$

Eq. [13] allows computing θ values from observed R and ρ values. If the slope θ remains constant across a sequence of frames, eq. [13] and a slope estimate from past frames may be used to determine a ρ value that yields a desired rate R in a current frame.

In some embodiments, a linear distortion-quantization model may be used to estimate the effect of quantization parameter changes on picture distortion. Let $\sigma^2$ be the picture prediction error variance. The ρ-domain mean square error distortion may be taken to be $$D(\rho) = \sigma^2 e^{-\alpha(1-\rho)} \quad [14]$$

where α is constant. An equivalent linear form is $$\ln\frac{\sigma^2}{D(\rho)} = \alpha(1-\rho) \quad [15]$$

A theoretical justification for the exponential form of D(ρ) in eq. [14] is based on a Laplacian distribution of frequency-domain (e.g. DCT) coefficients. In general, in some embodiments, a generalized-Gaussian (Laplacian or Gaussian) model may be used to approximate frequency-domain coefficient distributions.

The linear relation of eq. [15] was tested by encoding various sequences multiple times with 16 to 24 different quantization parameters and running linear regressions on the resulting rates with respect to the percentages of zero DCT coefficients. The variance $\sigma^2$ was computed based on the prediction error DCT data, i.e. the difference between the original and (reconstructed) prediction. The estimation process may be simplified if the prediction error average is zero. Tested sequences passed the Fisher null hypothesis test with an associated probability of 99.999%. The coefficient of determination r2 (i.e. the proportion of rate variation explained by the linear regression) varied from 95% to 90%. The 90% determination coefficient suggests that on a frame-by-frame basis, an observed value of the distortion parameter α defined as $$\alpha = \frac{1}{1-\rho}\ln\frac{\sigma^2}{D} \quad [16]$$

may be less reliable (stable) when used in a distortion-quantization model than the slope parameter θ used in a rate-quantization model according to eq. [13].

Rate Control at the Content Category Level

As eq. [1a] indicates, macroblock-level quantization parameters may be derived from content-category-level quantization parameters. In some embodiments, to determine content-category-level quantization parameters, the encoder determines for each content category a content category slope θ, distortion parameter α, target bitrate $R^T$, and quantization parameter $QP^T$. After the entire picture is encoded, the bitrate, percentage of zero coefficients, and slope values may be updated for each content category, for use in encoding subsequent pictures.

If $R_m$ and $NZ_m$ are the macroblock bitrate and number of non-zero coefficients, the corresponding content category bitrate $R_r$ and number of non-zero coefficients $NZ_r$ may be defined according to eq. [6] as $$R_r = \frac{1}{8}\sum_{m\in M} s_{m,r}R_m \,\forall\, r \in R \quad [17a]$$

$$NZ_r = \frac{1}{8}\sum_{m\in M} s_{m,r}NZ_m \,\forall\, r \in R. \quad [17b]$$

If each macroblock has $NC_m = 384$ coefficients, a content category's total number of coefficients is $$NC_r = \frac{1}{8}\sum_{m\in M} s_{m,r}NC_m = N_r NC_r = 384\, N_r \,\forall\, r \in R \quad [18]$$

where $N_r$ is the size (in macroblocks) of content category r.

The percentage of zero coefficients n the content category r is then $$\rho_r = 1 - \frac{NZ_r}{384 \, N_r} \, \forall \, r \in R \quad [19]$$

The content category slope $\theta_r$ may be expressed as an average slope per macroblock in the content category, i.e.

$$\theta_r = \frac{1}{1-\rho_r} \frac{R_r}{N_r} \, \forall \, r \in R. \quad [20]$$

For a prediction error average of zero, a content category prediction error variance $\sigma_r^2$ is $$\sigma_r^2 = \frac{1/8 \sum_{m \in M} s_{m,r} SSPE_m}{384 \, N_r} \, \forall \, r \in R \quad [21]$$

where $SSPE_m$ is the macroblock sum of squared prediction error. As a function of the macroblock sum of squared errors $SSE_m$, a content category distortion $D_r$ and distortion parameter $\alpha_r$ are $$D_r = \frac{1/8 \sum_{m \in M} s_{m,r} SSE_m}{384 \, N_r} \, \forall \, r \in R \quad [22]$$

$$\alpha_r = \frac{1}{1-\rho_r} \ln \frac{\sigma_r^2}{D_r} \, \forall \, r \in R. \quad [23]$$

Based on a picture target bitrate $R^T$, each content category r is allocated a bitrate of $R_r^T$. If each content category r and its complement $\bar{r}$ cover the whole picture, the sum of the rates for each content category and its complement is equal to the picture target bitrate $R^T$:

$$R_r^T + R_{\bar{r}}^T = R^T \forall r \in R. \quad [24]$$

In general, not all content categories are equally important for achieving an optimal visual quality. In some embodiments, more bits are allocated to content categories whose contribution to overall picture quality is subjectively higher.

Each content category r may be assigned a relative weight $w_r$. In some embodiments, the content category weights may be fixed weights, empirically determined ahead of time. In some embodiments, the content category weights may be dynamically adjusted for each picture based on one or more complexity measures such as variance and motion.

In some embodiments, the picture target rate may be allocated among content categories according to the relations:

$$R_r^T = \frac{N_r w_r}{N_r w_r + N_{\bar{r}} w_{\bar{r}}} R^T, \; R_{\bar{r}}^T = \frac{N_{\bar{r}} w_{\bar{r}}}{N_r w_r + N_{\bar{r}} w_{\bar{r}}} R^T \, \forall \, r \in R \quad [25]$$

According to eq. [25], the rate allocated to a given content category is proportional to the content category weight and the size of the content category. Eq. [25] provides a relatively simple model for rate allocation. At the same time, the relations of eq. [25] may not take into account the effects of rate allocation decisions on distortion.

In some embodiments, the content category rate allocation decisions are performed according to their effects on one or more distortion parameters. A distortion-quantization model allows optimally allocating bits over multiple encoding entities or sources in order to minimize the total distortion for a given bit rate. Encoding entities/sources may include like pictures, objects, groups of macroblocks, and/or content categories. In some embodiments, the bit allocation process attempts to minimize the picture distortion subject to a given target bit rate.

A picture distortion D as a function of a content category distortion $D_r$ may be expressed as $$D = \frac{N_r D_r + N_{\bar{r}} D_{\bar{r}}}{|M|} \, \forall \, r \in R. \quad [26]$$

Eq. [26] may be generated by expressing the distortion for the category r and its complement according to eq. [22]:

$$N_r D_r + N_{\bar{r}} D_{\bar{r}} = \quad [27]$$

$$\frac{1/8 \sum_{m \in M} s_{m,r} SSE_m}{384} + \frac{1/8 \sum_{m \in M} s_{m,\bar{r}} SSE_m}{384} = \frac{\sum_{m \in M} SSE_m}{384} = |M|D$$

If the picture rate R as a function of the content category rate $R_r$ is $$R = R_r + R_{\bar{r}} \forall r \in R \quad [28]$$

then the optimum bit allocation problem may be defined as $$\min_{R_r} \sum_{r \in R} N_r D_r + N_{\bar{r}} D_{\bar{r}} \Leftrightarrow \min_{R_r} \sum_{r \in R} N_r D_r \quad [29]$$

subject to $$\sum_{r \in R} R_r + R_{\bar{r}} = |R| R^T \Leftrightarrow \sum_{r \in R} R_r = \frac{|R|}{2} R^T \quad [30]$$

wherein $R^T$ is the target rate. Eqs. [29-30] formally express the goal of minimizing the total picture distortion (eq. [29]) subject to a given target bit rate (eq. [30]).

If the variance $\sigma_r^2$, distortion parameter $\alpha_r$, and slope $\theta_r$ are known, the bit allocation optimization problem of eqs. [29-30] becomes (see eqs. [13-14]):

$$\min_{\rho_r} \sum_{r \in R} \sigma_r^2 e^{-\alpha_r(1-\rho_r)} N_r \quad [31]$$

subject to $$\sum_{r \in R} \theta_r (1-\rho_r) N_r = \frac{|R|}{2} R^T. \quad [32]$$

Using a Lagrange multiplier technique, the constrained minimization problem of eqs. [3]-32] has a solution $$R_r^T = \theta_r(1-\rho_r^T)N_r = \xi_r N_r \ln\frac{\sigma_r^2}{\xi_r} + \frac{\xi_r N_r}{\sum_{r \in R}\xi_r N_r}\left(\frac{|R|}{2}R^T - \sum_{r \in R}\xi_r N_r \ln\frac{\sigma_r^2}{\xi_r}\right), \quad [33]$$

$$\xi_r = \frac{\theta_r}{\alpha_r}.$$

A rate-distortion optimization process may employ an optimization parameter λ, generally known in the field. A content category quantization parameter $QP_r^T$ corresponding to a content category target rate computed according to eq. [33] may be determined by interpolation, using the percentage of non zero coefficients $\sigma_r^T$, as described in detail below.

If the current frame is similar enough to the immediately previous one (for example, if there is no scene change), the slope $\theta_r$ and distortion parameter $\alpha_r$ may be safely estimated based on the past history of the two parameters. The historical values of the slope and distortion parameters may be averaged, smoothed, or simply used as such. In case of a scene change, a scene-change I picture is created and its parameters may be assigned empirically-estimated values. In some embodiments, a multi-encoding and interpolation process may be used to estimate slope and distortion parameter values following a scene change: the first frame after the scene change is encoded with multiple (e.g. 2) sample QP values to measure slope and distortion parameters for each sample QP value, and desired slope and distortion parameters for a different QP are determined by interpolation from the sample-QP encoding results.

As long as there is no scene change, the slope $\theta_r$ variation from the immediately previous picture to the current for a given content category r one is generally minimal. The target percentage of zero coefficients $\rho_r^T$ is $$\rho_r^T = 1 - \frac{1}{\theta_r}\frac{R_r^T}{N_r} \forall r \in R \quad [34]$$

In some embodiments, the target $QP^T$ may be found by interpolation as described below. There is a one-to-one relation between rate (or ρ, the percentage of zero coefficients) and QP, even if there isn't necessarily a closed-form formula (linear, polynomial, exponential, logarithmic, etc) to describe the relation. In general, the percentage of zero coefficients corresponding to a given QP may be estimated by computing an approximate distribution of frequency-domain coefficients. Such an estimation process may be relatively computationally-intensive. In some embodiments, ρ is explicitly determined for a few QP values, and unknown $QP^T$ values are calculated by interpolation between the nearest known QP values. Such an interpolation technique may be relatively less computationally demanding.

The accuracy of such an interpolation technique may be evaluated by determining the difference between the $\rho_{S,N}$ value estimated for a certain $QP_S$ while encoding with a different $QP_N$ and the corresponding $\rho_S$ value determined when encoding with $QP_S$. The precision of the estimate depends on the distribution of coefficients, as illustrated by the data of Table 2. Table 2 shows computed differences between $\rho_{S,N}$ (estimated by interpolation) and $\rho_S$ (true value) for two test bit sequences, for several $QP_N$ ranges and differences between $QP_S$ and $QP_N$. Table 2 lists both average and maximum errors for each range. As shown, large $QP_N$ values tended to allow better $\rho_{S,N}$ estimates. At the same time, on a relative scale, if the $QP_S$ is $QP_N$+/−16%, the relative $\rho_{S,N}$ versus $\rho_S$ average error was observed to be consistently less than 5%.

TABLE 2

| | | Sequence A | | Sequence B | |
|---|---|---|---|---|---|
| $QP_N$ | $QP_S$ vs. $QP_N$ | $\rho_{S,N}$ vs. $\rho_S$ Ave Err | $\rho_{S,N}$ vs. $\rho_S$ Max Err | $\rho_{S,N}$ vs. $\rho_S$ Ave Err | $\rho_{S,N}$ vs. $\rho_S$ Max Err |
| [0, 20) | [+/−4%, +/−8%] | 0.23% | 0.79% | 0.40% | 0.52% |
| | [+/−8%, +/−16%] | 0.50% | 1.17% | 0.27% | 0.59% |
| | [+/−16%, +/−32%] | 0.60% | 1.76% | 1.13% | 3.04% |
| [20, 27) | [+/−8%, +/−16%] | 0.99% | 2.48% | 0.24% | 1.18% |
| | [+/−16%, +/−32%] | 1.65% | 3.72% | 0.42% | 2.07% |
| [27, 34) | [+/−4%, +/−8%] | 0.35% | 1.12% | 0.03% | 0.14% |
| | [+/−8%, +/−16%] | 1.03% | 3.14% | 0.09% | 0.53% |
| | [+/−16%, +/−32%] | 1.42% | 4.03% | 0.38% | 1.09% |
| [34, 52) | [+/−4%, +/−8%] | 0.07% | 0.29% | 0.02% | 0.11% |
| | [+/−8%, +/−16%] | 0.39% | 1.37% | 0.10% | 0.76% |
| | [+/−16%, +/−32%] | 1.83% | 3.67% | 0.23% | 1.45% |

Rate Control at the Macroblock Level

As described above (see eqs. [1a-b]), the content category QPs may be used to assign a QP value for each macroblock to be encoded. In particular, content category QP adjustments may be used to set macroblock-level QP adjustments. The QP adjustments are used to modulate a baseline-level QP for the macroblock. Such an adjustment is first assigned at the content-category level, and then propagated to the macroblock level by linear combination using similarity measures as weights. If $\delta_r$ is a content-category-level level QP modulation, a macroblock-level QP modulation $\delta_m$ may be assigned to be $$\delta_m = \frac{1}{8}\sum_{r \in R} s_{m,r}\delta_r \forall m \in M. \quad [35]$$

In some embodiments, modulations determined according to eq. [35] are added to a slice-level QP to determine a QP for each macroblock:

$$QP_m = QP_{slice} + C\delta_m \quad [36]$$

wherein $QP_{slice}$ is a baseline quantization parameter for all macroblocks in a given slice, and C is a normalization constant used to scale the $\delta_m$ term with respect to $QP_{slice}$ as desired for a given scale chosen for $\delta_m$. In some embodiments, the scale for $\delta_m$ may be chosen such that C=1.

In some embodiments, the set of content-category level QP modulations (relative QP changes) may be defined as a mixture of positive and negative values (increase for some content categories, decrease for others) and scaled such that the average QP modulation for all macroblocks in a slice is zero, i.e.

$$\sum_{r \in R} N_r \delta_r = 0 \quad [37]$$

Such a constraint may be particularly desirable when rate control is active. If a QP baseline is defined over an image unit other than a slice (e.g. over a frame), the QP modulation summation of eq. [37] may be performed over that image unit.

Multiple Content Category Usage Modes

In some embodiments, the encoder is capable of employing several usage modes for the defined content categories. In some embodiments, available usage modes include proportional, dominant, priority, and all-inclusive. The usage mode used by the encoder may depend generally on the particular variable to be computed and/or decision to be made. Some parameters, such as QP and λ, are computed using a proportional content-category usage mode. For other computations or decisions, such as macroblock encoding mode decisions or computations of parameters used in macroblock encoding mode decisions, the content categories may be used in a dominant, priority, or all-inclusive mode. Each type of computation or decision may have a corresponding usage mode determined by the algorithm used to make that computation/decision. In some embodiments, each content category may enable one or more associated usage modes selected from among the four available usage modes. In some embodiments, the proportional mode is used for computing variables that scale, such as QP modulations and λ, while the other modes (dominant, priority, and all-inclusive) are used for binary decisions such as encoding mode decisions. In other embodiments, some scalable parameters may be set using one of the dominant, priority, and all-inclusive modes, while some binary decisions may be made according to a value of a parameter determined using the proportional mode approach.

The proportional mode is described generally by Eqs. [1a-b] and [35] above. The proportional usage mode may be used for computing encoding parameters such as $\delta_m$ (macroblock-level QP modulation) and $\lambda_m$ (macroblock-level λ) from corresponding content-category level parameters, among others. In some embodiments, a proportional-like usage mode may also be used to make encoding mode decisions. For example, a binary encoding mode decision for a block may be made according to a result of a weighted linear combination of content category parameters as shown in eq. [1a].

In a dominant mode, a block encoding parameter is set or an encoding mode decision is made according to a corresponding encoding parameter or mode decision defined for a maximum-similarity content category. For example, a block encoding parameter may be set to be equal to a corresponding content-category level parameter for the maximum-similarity content category. Encoding mode decisions may include decisions to encode a block using inter- or intra-encoding, choices of block/partition sizes, as well as choices of intra prediction directions. A block encoding mode may be set to a preferred encoding mode defined by the maximum-similarity content category, such as an encoding mode using a 16×16 block size and inter-encoding.

In a priority mode, a block encoding parameter is set or an encoding mode decision is made according to a corresponding encoding parameter or mode decision defined for a priority content category, as long as a similarity measure of the block to the priority content category meets a condition (e.g. is non-zero, or exceeds a threshold). An exemplary priority content category is a red content category (see Category 5 defined in Table 1 above), characterized by a minimum required amount of red content. Red content in a video image block beyond a minimum threshold (e.g. predominantly red content) can be highly predictive of the block encoding properties, regardless of other spectral properties of the block. In some embodiments, video image blocks that are sufficiently red are encoded according to parameters/encoding modes set by the red content category, substantially independently of the similarity of the blocks to other defined content categories. Another exemplary priority content category may be a content category defined for data exhibiting a minimum amount of color saturation, among other characteristics.

An exemplary encoding mode decision according to a priority content category is a decision of enabled intra-prediction directions for a block. Consider the set of neighboring macroblocks 300 shown in FIG. 6. If a given block 310 is sufficiently similar to the red content category, only neighboring blocks that are sufficiently red are enabled as intra-prediction candidates for the given block. If a neighbor 316 above the red block 310 is not sufficiently red, the vertical intra-prediction direction defined by neighbor 316 is not enabled and evaluated for intra-predictively-encoding the red block 310. At the same time, if a neighbor 312 to the left of the target red block 310 is sufficiently red, intra-prediction direction defined by the neighbor 312 is enabled and evaluated for intra-predictively-encoding the target red block 310.

In an all-inclusive mode, the encoder allows any encoding mode permitted by any region having a minimum (e.g. non-zero) similarity to the current block. For example, some content categories may restrict an encoding mode to particular intra-prediction directions or macroblock partition sizes. In an all-inclusive mode, an encoding mode is allowed provided it is enabled by any content category having a minimum similarity with respect to the current macroblock, even if such an encoding mode is not enabled by other content categories.

The proportional, dominant, and priority encoding modes may be better understood by considering a simple example. Consider a system using 3 regions, for which the encoder has assigned some exemplary parameter P values of −6, +2, and −2, respectively. As above, similarity measures range from 0 to 8. For this illustration, assume that the third content category has the highest priority among the three content categories.

For a macroblock having a similarity value set of {0,8,0} with respect to the three content categories, a proportional-mode parameter value $P_m$ computed according to eq. [35] is:

$$P_m = \frac{1}{8}(0*(-6) + 8*(+2) + 0*(-2)) = +2. \quad [38]$$

For the dominant mode, the corresponding $P_m$ value is +2, since the second content category has the highest similarity measure with respect to the current macroblock. In the priority mode, since the priority content category (the $3^{rd}$ content category) has a similarity measure of zero with respect to the current macroblock, the encoder may switch to one of the proportional or dominant mode values.

For a macroblock having a similarity value set of {1,5,3} with respect to the three content categories, a proportional-mode $P_m$ value is $$P_m = \frac{1}{8}(1*(-6) + 5*(+2) + 3*(-2)) = -\frac{1}{4}. \quad [38]$$

For the dominant mode, the $P_m$ value is +2, since the second content category has the highest similarity measure with respect to the current macroblock. For the priority mode, the $P_m$ value is −2, the P value set for the priority content category (the $3^{rd}$ content category).]

In some embodiments, encoding-mode decisions for each block are facilitated by use of an encoding-mode bitmask for the block. The encoding-mode bitmask for a block indicates which encoding modes (e.g. intra/inter, intra prediction directions, partition sizes, etc.) are enabled for the block. The encoding-mode bitmask for a block may be generated from corresponding content-category encoding mode bitmasks, as desired according to the content category usage mode employed to make the encoding mode decision. Each content category may have an associated encoding-mode mask indicating which encoding modes are enabled by the content category. For example, if there are 16 total encoding modes, the encoding mode mask for a content category may include 16 bits, each indicating whether the corresponding encoding mode is enabled by the content category. In an all-inclusive content-category usage mode, an encoding-mode bitmask for a block may be generated by performing a bitwise OR operation on all bitmasks for content categories having non-zero similarity with respect to the block of interest. The resulting enabled encoding modes are evaluated for selection for the block. In a dominant usage mode, the encoding mode bitmask for the block is set to the encoding mode bitmask of the dominant content category. In a priority usage mode, the block encoding mode bitmask is set to that of a priority content category if one with non-zero similarity is found, and to the bitmask of a dominant content category otherwise. If no dominant category is found, all encoding modes allowed by the similar content categories may be evaluated for selection.

In some embodiments, the content-category-based encoding processes described above are performed selectively only if a current frame meets a qualification condition. For example, if a measure of motion within the current frame exceeds a predetermined threshold, the current frame may be encoded without using content categories.

Exemplary Content-Category-Based Encoding Parameters, Encoding Mode Decisions, Statistics In some embodiments, block-level encoding parameters determined by encoder 110 according to corresponding content-category-level parameters include: a QP modulation $\delta_m$ a rate-distortion Lagrange multiplier parameter $\lambda$, a set of dead-zone parameters, and a set of rate-offset parameters.

Exemplary ways of deriving a block-level QP modulation $\delta_m$ from a set of corresponding content-category-level QP modulations $\delta_r$ are described above. The Lagrangian rate-distortion optimization parameter $\lambda$ may be expressed as $\lambda=\text{mant}*2^{exp}$. The variables mant and exp can be estimated at the block level from corresponding content-category-level values using a proportional usage mode approach as described above. In a dominant usage mode, block-level mant and exp values may be derived from the slice QP, dominant content category QP, or block-level QP value.

Dead-zone intervals may be used to change the quantization slope and/or set the final transform coefficient values to 0, 1, or other (e.g. random) values. In some embodiments, block-level dead zones are determined using a dominant usage mode, i.e. block-level dead-zone settings are set equal to those of the dominant content category.

Rate-offset parameters may be used to offset the coded residue bitrate used in the rate-distortion optimization process in order to bias the process. Luma and chroma residue rates for inter encoding modes may be offset as follows: for an encoding mode using a proportional content-category usage-mode, a rate offset is added when the residue (luma plus chroma) is non-zero, and the residue rate is set to a specific value when the luma and chroma residues are zero; for inter-encoding modes using a dominant content-category usage mode, the luma and/or chroma residues are forced to zero.

Figure 6:
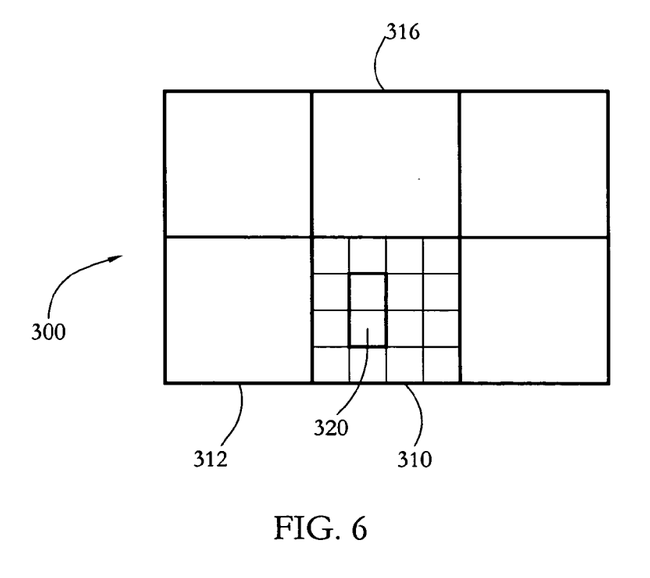
FIG. 6 shows a set of exemplary neighboring macroblocks and potential internal partitions of one of the macroblocks according to some embodiments of the present invention.

In some embodiments, block encoding mode decisions are made according to parameters defined by similar content categories. The dominant content-category usage mode is particularly useful for making block encoding mode determinations. Exemplary encoding mode decisions include decisions between intra and inter-encoding modes. Within intra modes, encoding mode decisions may include decisions on macroblock partition sizes (e.g. 4×4 or 8×8) and prediction directions (horizontal, vertical, plane, diagonal). FIG. 6 shows an exemplary 4×8 macroblock partition 320 forming part of a 16×16 macroblock 310. Within inter modes, encoding mode decisions may include decisions to enable half pel, quarter pel, or direct modes, or choosing from several available strategies for performing a motion vector search.

In some embodiments, a set of statistics computed by pre-processing engine 112 (FIG. 1) for each content category r may include a content category size $N_r$ (see eq. [7]). A set of content-category-level and full-frame statistics computed by statistics unit 160 (FIG. 2) may include: a sum of QPs, a number of non-zero coefficients in the encoded bitstream, a number of non-zero quantized coefficients for two extra QPs, a bitrate (number of bits used for encoding), a sum of squared prediction errors, a sum of residues and a sum of squared residues, and a number of zero residue values. The content-category-level statistics are computed using eq. [6] above. Statistics unit 160 also computes full-frame statistics, which are generated from block-level statistics by summing over all blocks in the frame.

The preferred systems and methods described above allow assigning video encoding parameters and making block encoding mode decisions in a relatively simple yet effective way.

The methods allow achieving relatively good visual quality performance for relatively limited computational costs and rate and power requirements. Good visual performance in low-power environments may be particularly useful in portable video devices, or other devices operating on batteries or otherwise subject to power limitations.

Setting an encoding parameter value for a macroblock to a combination of values determined for non-exclusive content categories may be particularly useful for macroblocks situated along object or area boundaries, for which an assignment decision may be inherently ambiguous. For example, in a simple illustration, a macroblock whose content is half sky and half grass may be encoded with a quantization parameter approximately half-way between quantization parameters selected for grass and sky for the picture as whole.

The computational efficiency of the preferred video encoding systems and methods described above is also enhanced by performing the rate-distortion analysis in the $\rho$-domain, as described above. In some embodiments, however, other methods or variable domains may be used to assign content-category level quantization parameters.

The present invention further provides computer systems programmed to perform the method steps described above, as well as computer-readable media encoding instructions to perform the preferred method steps described above.

It will be clear to one skilled in the art that the above embodiments may be altered in many ways without departing from the scope of the invention. Accordingly, the scope of the invention should be determined by the following claims and their legal equivalents.

What is claimed is:

1. A video encoding method comprising:
    defining a plurality of content categories;
    setting a value of a content-category-level encoding statistical indicator for each content category of a plurality of content categories, the value is a combination of a plurality of block-level encoding statistical indicators that characterize encoding of macroblocks in a first video frame; and
    encoding video data in a second video frame according to the value of the content-category-level encoding statistical indicator for at least one content category, the at least one content category is selected from the plurality of content categories based on similarity of macroblocks in the second video frame to each content category in the plurality of content categories.

2. The method of claim 1, wherein the combination is a weighted linear combination.

3. The method of claim 2, wherein the weighted linear combination comprises a plurality of weights, each weight being indicative of a block-content category similarity.

4. A video encoder comprising:
a content category processing unit defining a plurality of content categories and setting a value of a content-category-level encoding statistical indicator for each content category of a plurality of content categories, the value is a combination of a plurality of block-level encoding statistical indicators that characterize encoding of macroblocks in a first video frame; and
encoding logic connected to the content category processing unit, the encoding logic encoding video data in a second video frame according to the value of the content-category-level encoding statistical indicator for at least one content category, the at least one content category is selected from the plurality of content categories based on similarity of macroblocks in the second video frame to each content category in the plurality of content categories.

5. A video encoder comprising:
means for defining a plurality of content categories and setting a value of a content-category-level encoding statistical indicator for each content category of a plurality of content categories to a combination of a plurality of block-level encoding statistical indicators, the value is a combination of a plurality of block-level encoding statistical indicators that characterize encoding of a macroblocks in a first video frame; and
means for encoding video data in a second video frame according to the value of the content-category-level encoding statistical indicator for at least one content category, the at least one content category is selected from the plurality of content categories based on similarity of macroblocks in the second video frame to each content category in the plurality of content categories.

* * * * *